Feb. 14, 1956 F. G. STEELE 2,735,005

ADD-SUBTRACT COUNTER

Filed March 27, 1950

INVENTOR:
FLOYD G. STEELE

BY Herbert E. Metcalf

HIS PATENT ATTORNEY

United States Patent Office 2,735,005

Patented Feb. 14, 1956

2,735,005

ADD-SUBTRACT COUNTER

Floyd G. Steele, Manhattan Beach, Calif., assignor to Northrop Aircraft, Inc., Hawthorne, Calif., a corporation of California Application March 27, 1950, Serial No. 152,041

9 Claims. (Cl. 250—27)

This invention relates to counters and more particularly to an electronic counting circuit capable of both additive and subtractive counting.

In counting devices, for example, those useful in digital computers, it is advantageous to be able to have an electronic counting circuit which can count both up and down, dependent on the sign of the pulse fed into it, so that a recording or storing of the numerical value of a stream of pulses can be procured.

Among the objects of this invention are:

To provide a means for obtaining the numerical value of a stream of pulses representing positive and negative increments of a variable.

To provide a means of controlling the carry pulses between stages of a binary counter.

To provide a two-way counting circuit wherein positively and negatively signed pulses are fed therein on opposite incoming lines.

To provide a two-way counting circuit wherein positively and negatively signed pulses are fed in on a single incoming line and a change in sign of the pulses is indicated by a pulse fed in on a second incoming line.

Briefly, the present invention comprises a set of electronic flip-flop circuits arranged in cascade so as to form binary stages. Each of the flip-flop stages trigger when pulses of a single polarity are fed therein. For each binary stage, the plate voltage of one of the tubes is connected to a gating circuit which supplies the count-up carry pulse to the next flip-flop stage; and the plate voltage of the other tube is similarly connected to another gating circuit which supplies the count-down carry pulse. Means are provided so that either one carry pulse or the other is controlled to be switched into the succeeding stage according to the sign associated with the incoming pulse to the counter.

The invention will be more fully understood by reference to the following description of the appended drawings, in which.

Figure 1:
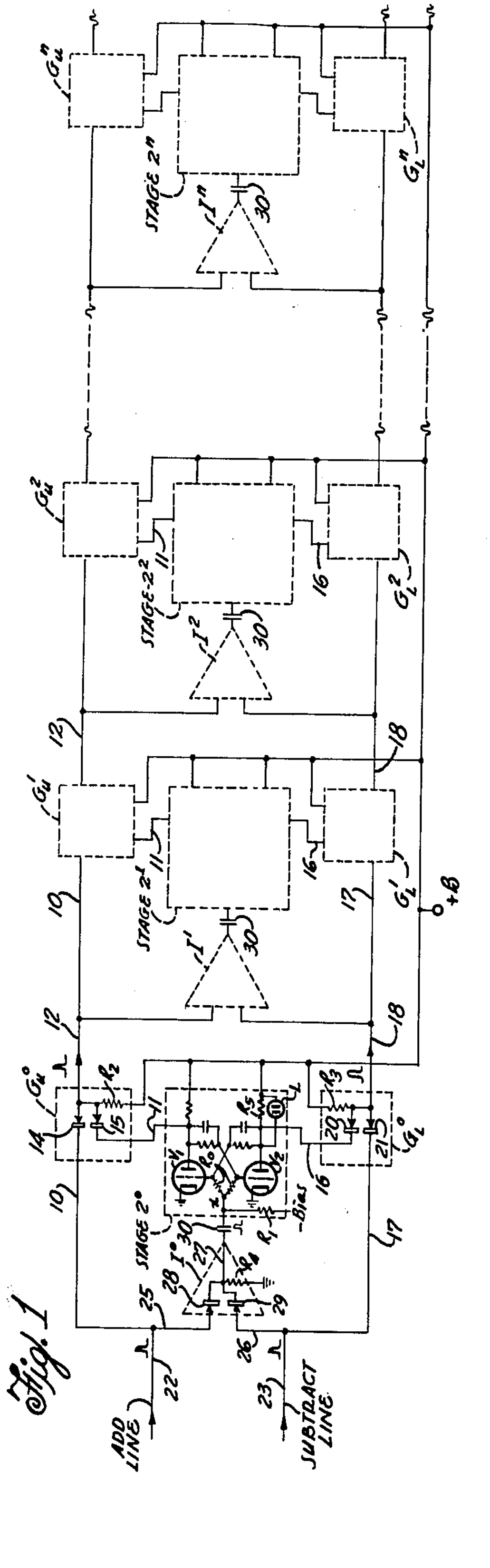
Figure 1 is a diagram, partly schematic, showing in full circuit diagram the first stage of one embodiment of a two-way binary counter having separate incoming lines for the positively and negatively signed input pulses.

Referring first to Figure 1 a schematic diagram, partly detailed, is shown of one embodiment of the binary counting circuit of the present invention. The counting circuit is so designed that it counts up or down dependent on which of two input lines the positive polarity pulses are being fed into it.

The counting circuit is formed from a plurality of flip-flop stages $2^0$, $2^1$ * * * $2^n$ connected in series as will be explained. The flip-flop stages for the preferred embodiment of this invention are modified Eccles Jordan circuits; and, as shown for stage $2^0$, consist of two triodes $V_1$ and $V_2$ with their plates and grids interconnected by resistors and capacitors as is well known. Each of the grids also is connected through individual resistances $R_0$ to a common point X. Point X is negatively biased by a bias resistor $R_1$.

As is well known, the stable states of the flip-flops are when either tube $V_1$ or $V_2$ is conducting. For the present embodiment, when the tube $V_1$ conducts the digit "zero" is considered to be in the stage, and when tube $V_2$ conducts the digit "one" is considered to be in the stage. A stage is triggered from one state to the other by a positive pulse applied at point X of the flip-flop. In order to visually indicate the reading in the counter, a neon lamp L is connected across the plate load resistor $R_5$ of tube $V_2$ of each flip-flop. This lamp L is lit when the digit "one" is in the stage and is dark when the digit "zero" is in the stage.

Each flip-flop stage $2^0$, $2^1$, etc. has two gates associated with it. An upper gate designated $G_u^0$, $G_u^1$, etc., and a lower gate designated $G_L^0$, $G_L^1$, etc. These gates function as carry gates as will be explained.

Each of these carry gates has two input leads and one output lead.

Each of the upper gates $G_u^0$, $G_u^1$ has its input leads designated 10 and 11 and its output lead designated 12. The input leads 10 and 11, in each upper gate circuit, connect therein to the cathode designated ends of, for example, germanium diodes 14 and 15 respectively. The plate designated ends of these diodes are joined together to connect to the output lead 12 of the upper gate. This junction of the two diodes 14 and 15 is also connected through a resistor $R_2$ to a source of positive potential B. Similarly, each of the lower gates $G_L^0$, $G_L^1$, etc has input lines 16 and 17, and an output line 18. These input lines are connected in a similar manner to germanium diodes 20, 21. The output from these diodes connect together to form output line 18 which is also connected to a positive source B through a resistor $R_3$.

Since the action of all the upper and lower gates are the same, only gate $G_u^0$ will be explained.

Gate $G_u^0$ functions to give a relatively high output voltage on output lead 12 only when input voltages therein on both input leads 10 and 11 are of a relatively high voltage. If either one or the other, or both of the input leads 10 and 11 has a relatively low voltage thereon, the output voltage on output lead 12 is relatively low. This is accomplished because if the voltage on one or both of the input leads 10 and 11 is low, the resistor $R_2$ draws current, and thus the resultant voltage drop in resistor $R_2$ makes the voltage relatively low in the output lead 12. However, if the voltage on both input leads 10 and 11 is high, neither diode 14 nor 15 will conduct, and there will be no voltage drop across $R_2$ so that output lead 12 will essentially exist at the high voltage of positive source B. Thus, for this latter condition, if the high voltage on input lead 10 is of a relatively short duration such as a positive pulse, the output on lead 12 is a positive pulse.

Each of the upper gates, as shown in detail for stage $2^0$, has the outer terminal of its input lead 11 connected to the plate of tube $V_1$ of the associated flip-flops stage; and each of the lower gates has the other terminal of its input line 16 connected to the plate of tube $V_2$ of the associated flip-flop stage. Thus, these gates are controlled by their associated flip-flops in such a manner that when the tube, to whose plate they are connected, is non-conducting, the gates are open for permitting positive pulses on either of the other inputs 10 or 17 to pass therethrough.

The upper gate $G_u^0$ of the first stage has the outer terminal of its input lead 10 connected to the input add line 22 of the counter, and all the other upper gates for the remaining stages have the outer terminals of their corrresponding input leads 10 connected to the output lead 12 from the upper gate associated with the previous stage.

The lower gates are connected in a similar manner. Gate $G_L^0$ of the first stage has the outer terminal of its other input line 17 connected to the input subtract line 23 of the counter and all the other lower gates have the outer terminals of their corresponding input lines 17 connected to the output lead 18 from the previous gate.

In order for the counter to be able to count up and down, it is necessary that the first stage be able to be triggered by a positive pulse feeding into its flip-flop at point X from either the add line 22 or the subtract line 23.

Similarly each successive flip-flop must be able to be triggered by a positive pulse from either the upper or lower previous carry gates. Hence, an isolator circuit $I^0$, $I^1$, etc., is provided at the input to each flip-flop stage for enabling these pulses to be fed into the point X of the stage from one set of carry gates without disturbing the circuit through the other set of carry gates thus enabling diode gates to be used in the system.

The circuit of a typical isolator $I^n$ is similar to the typical circuits of the upper and lower gates $G_u^n$ and $G_L^n$ in that it has two input conductors 25 and 26, and one output conductor 27 as shown, in particular, for isolator $I^0$. The input conductors 25 and 26 of the isolator circuit connect the plate designated ends of germanium diodes 28 and 29 to the input add line 22 and the input subtract line 23 respectively, for the first stage of the counter; and to the output from the preceding carry gates $G_u^n$ and $G_L^n$ for the remaining stages of the counter. The cathode designated ends of these diodes in the isolator circuit $I^n$ are joined together to form the output conductor 27 which connects the output of the isolator to point X of the flip-flop through a capacitor 30 for each case. The junction of the two diodes 28 and 29 is connected to ground through a resistor $R_4$. Thus this junction is ordinarily at ground potential; however, any time a positive pulse appears on either one or the other of the input conductors 25 or 26, a current is drawn through resistor $R_4$ to make this junction momentarily positive.

The isolator $I^n$ thus serves to isolate the incoming pulses, on either of the input conductors to the isolator, from being felt on the other input conductor.

Thus in accordance with the present invention the upper gates $G_u^0$, $G_u^1$, etc., connect the flip-flop stages for additive counting; and the lower gates $G_L^0$, $G_L^1$, etc., connect the stages for subtractive counting. This is accomplished because the upper and lower gating arrangement shown causes the binary stages to have a carry pulse, when an incoming pulse is fed into a stage in a "one" condition, for additive counting; and causes the binary stages to have a carry pulse, when an incoming pulse is fed into a stage in a "zero" condition, for subtractive counting.

In order to illustrate the operation of the binary counter, assume, for example, that the state of the counter for the first three stages is such that it contains the binary number 110 which, when read with the lowest order digit on the left, corresponds to $$(1\times2^0+1\times2^1+0\times2^2)$$

or the decimal number 3. Thus, the first and second stages have the digit "one" therein. This is the condition when the tubes $V_2$ are conducting in the first and second stages and the $V_1$ tube is conducting in the remaining stage. Assume now that a positive polarity pulse is fed into add line 22 of the counter. This pulse is simultaneously fed to gate $G_u^0$ on lead 10 and to isolator $I^0$ on conductor 25. Since the upper gates are able to pass a pulse on lead 10 when the input lead 11 connected to the flip-flop stage is positive, i. e., the stage is in a "one" condition, the positive add pulse passes the gates $G_u^0$ and $G_u^1$, and appears on isolators $I^1$ and $I^2$. The add pulse cannot pass gate $G_u^2$, however, because it is controlled by the stage $2^2$ which for the present example is in the "zero" state. Thus, the add pulse triggers stages $2^0$, $2^1$, and $2^2$. Stages $2^0$ and $2^1$ are each triggered from a "one" to a "zero" digit state, and stage $2^2$ is triggered from a "zero" to a "one" digit state. Thus, 001 or the decimal number 4 is now contained in the counter. If another positive pulse were fed into the add line 22, the add pulse would be stopped at gate $G_u^0$ and would only be able to trigger the first stage $2^0$ to thus record 101 or the decimal number 5 in the counter.

If now a pulse were to be fed into the counter on subtract line 23, the pulse would be stopped immediately by gate $G_L^0$ since stage $2^0$ is recording a "one." Thus this subtract pulse would only trigger the first stage to a "zero" condition. The number now recorded in the counter would be again 4 or 001. If another pulse were fed in on the subtract line 23 this pulse would pass gates $G_L^0$ and $G_L^1$, since they are both in the "zero" state, but would not pass $G_L^2$. This pulse would thus be enabled to change the state of the first three stages to record 110, or decimal number 3, in the counter.

Figure 2:
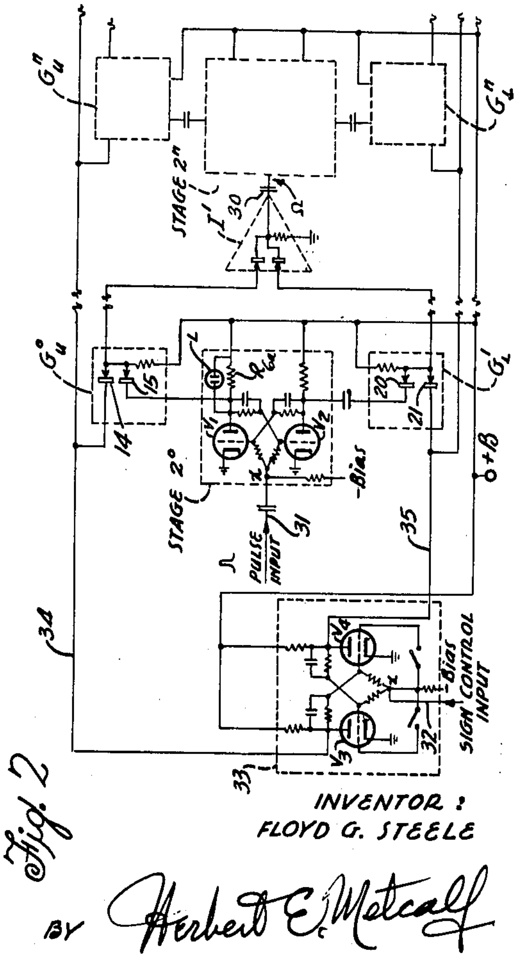
Figure 2 is a diagram, partly schematic, showing another embodiment of a two-way binary counting circuit having one incoming line which conveys both the positively and negatively signed pulses, and one incoming line which conveys pulses indicating the change in sign of the pulses on the first incoming line.

Referring next to Figure 2, a second embodiment of the invention is shown. Similar notation is used for parts in this embodiment identical to those in Figure 1. This two-way counting circuit enables both the positively and negatively signed input pulses to be fed in as a single polarity on a single incoming line 31. The change in sign of these input pulses is evidence, in a manner to be described, by a pulse on a second incoming line 32. As before, this second embodiment of the invention is formed from a plurality of modified Eccles Jordan flip-flops connected in series. Using like notations for similar parts, this later counting circuit has upper gates $G_u^0 \ldots G_u^n$ and lower gates $G_L^0 \ldots G_L^n$ associated with each of the flip-flop stages $2^0$ . . . $2^n$ respectively, as previously described.

Except for the first stage $2^0$, of this embodiment of the invention, an isolator circuit $I^1$, $I^2$, etc., identical to those previously described, is provided for connecting the output of the previous carry gates to the inputs of each of the latter stages $2^1$, $2^2$, etc. The incoming line 31 carries the input pulses directly into point X of the first flip-flop stage $2^0$.

A sign control flip-flop 33 is provided for remembering the sign of the input pulses. This control flip-flop, which is a modified Eccles Jordan circuit, is fed at its common input point X by pulses on second incoming line 32. From the plate of the left tube $V_3$ of the sign control flip-flop 33, a common upper gate control line 34 communicates that plate potential to each of the germanium diodes, like diode 14, of the upper gates $G_u^0$, $G_u^1$, etc. Similarly, a common lower gate control line 35 communicates the potential of the right tube $V_4$ plate of control flip-flop 33 to each of the germanium diodes, like diode 21, of the lower gates $G_L^0$, $G_L^1$, etc.

It should be noted that for this particular embodiment, the output from each gate is not a pulse but a high or a low voltage. Positive carry pulses are generated, however, on the output sides of capacitors 30, which differentiate the positive-going change in potential on the gate output lines. Since it is the positive-going change in potential which will cause a positive carry pulse to pass, the neon light L is connected across the load resistor $R_{6a}$ of tube $V_1$ for this case, so that it will be lit when a "one" is in a stage. Normally, a flip-flop counter stage will be used which will not be affected by negative pulses. However, a cliping diode (not shown) may be inserted in series with each input circuit just on the output side of point X, if desired, to prevent the application of unwanted polarity pulses at the flip-flop grids.

It should now be evident, from the description of the operation of the two-way counting circuit of Figure 1, that the operation of the present embodiment of the invention is obtained by controlling the upper and lower carry pulses between stages. When the potential of the left tube $V_3$ plate of control flip-flop 33 is relatively high, this high potential, in effect, opens all of the upper gates $G_u^0$, $G_u^1$, etc., of the counting circuit so that positive pulses, obtained by positive going potential changes on the plate of tube $V_1$ of the flip-flop stages, are passed to enable additive counting. The relatively low potential of the right tube $V_4$ plate of control flip-flop 33, for this case, closes all of the lower gates $G_L^0$, $G_L^1$, etc.

The next sign pulse fed in on second incoming line 32 triggers control flip-flop 33 and thus reverses the control potentials on the upper and lower carry gates, thus opening all the lower gates to enable input pulses fed in on incoming line 31 to be subtractively counted in the circuit.

Figure 3:
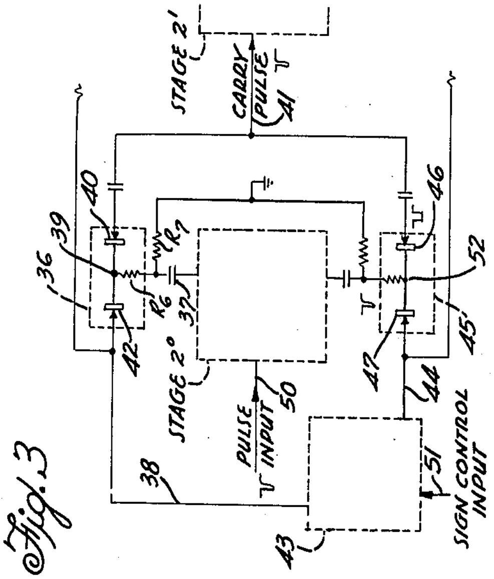
Figure 3 is another diagram of a modification of the embodiment of the counting circuit in Figure 2 utilizing a simplified gating circuit.

Referring next to Figure 3, a modification is presented of the counting circuit in Figure 2. Here, a simplified gating circuit 36 is provided which makes it possible to dispense with all the isolator circuits $I^0$, $I^1$, etc., of the two previous embodiments.

Each of the gating circuits 36, for this modification, comprises two germanium diodes, as before. However, for this arrangement, each of the plate output circuits of the flip-flop stages is connected through a capacitor 37 and resistor $R_6$ to a point in the gating circuit, like point 39 in Figure 3. A bias resistor $R_7$ connects the common junction of capacitor 37 and resistor $R_6$ to ground. Capacitor 37 and resistor $R_7$ constitute a differentiating circuit. A first upper diode 40 of upper gating circuit 36 has its cathode connected to point 39 and its anode to a common carry line 41 leading to point X of the next stage of the counting circuit. A second upper diode 42, of gating circuit 36, has its cathode also connected to point 39.

The anode of second upper diode 42 is connected to the upper control line 38 of a control flip-flop 43. This later control flip-flop is similar to the one in Figure 2. The flip-flop stages $2^0$, etc. of the counter of Figure 3 are adapted to be triggered by negative pulses, rather than the positive pulse-triggered stages of Figures 1 and 2, as is well known in the art.

The lower gating circuit 45 is similarly arranged with first and second lower diodes 46 and 47 connected to the common carry line 41 and the lower control line 44 of control flip-flop 43 respectively.

Assume for example, that the right tube of control flip-flop 43 is conducting which is the condition for enabling addition in the counting circuit. Thus the lower control line 44 is at a relatively low potential and the upper control line 38 at a relatively high potential. Assume further that the neon L (see Figure 2) in stage $2^0$ is conducting, which indicates a binary one in the stage $2^0$. The next input pulse on incoming line 50 triggers the flip-flop in stage $2^0$ and causes a positive pulse to be communicated along the upper plate circuit to point 39 of the upper gating circuit 36, and a negative pulse to be communicated along the lower plate circuit to point 52 of the lower gating circuit 45.

When the positive pulse appears on first and second upper diodes 40 and 42, since it drives their cathodes to a positive voltage, it does not pass either diode but rather is dissipated in the back impedance thereof. The negative pulse appearing on the lower plate circuit drives the cathode voltage of lower diode 46 sufficiently negative that the lower diode 46 conducts, thereby passing a carry pulse along common carry line 41 to the input of the next stage. Because of the negative plate voltage communicated from control flip-flop 43 to second lower diode 47, the negative pulse impressed at point 52 does not pass through second lower diode 47.

The next input pulse on incoming line 50 of the circuit of Figure 3 triggers flip-flop stage $2^0$ to its other stable condition and sends a negative pulse along the upper plate circuit and a positive pulse along the lower plate circuit. Again the positive pulse does not pass through either diode of the lower gating circuit since it drives both gate diode cathodes to a positive voltage and hence is dissipated in the circuit impedance. The negative pulse fed in the upper gating circuit causes a sufficient decrease of voltage at the cathode of upper diode 42 such that it passes current from upper control line 38 through resistor $R_6$ and $R_7$ to ground. A small pulse will pass through second upper diode 40, but, this pulse will be insufficient to trigger the next flip-flop stage, hence it is not a carry pulse.

When the sign control flip-flop 43 is in the stable position described, a carry pulse is emitted on common carry line 41 when the neon lamp L (Figure 2) of a stage changes from a lit to an unlit condition and the counting circuit therefore performs additive counting of the input pulses on incoming line 50. A reversal of the stable state of control flip-flop 43 due to a pulse on second incoming line 51 results in an exchange of the active output plate circuits and subtractive counting will result. It is here noticed that, for this case, the lower gating circuit 45, when opened by a negative potential from the sign control flip-flop 43, permits the carry pulse required for additive counting.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A two-way binary counting circuit comprising a plurality of bistable flip-flop stages, a first gate circuit means connected between the plate circuit of one tube of each of said stages and the input of the next succeeding stage to be open only when its assocated stage is in one of its two stable states, a second gate circuit means connected between the plate circuit of the other tube of each of said stages and the input of said next succeeding stage to be open only when said associated stage is in the other stable state, two separate input lines for feeding pulses into said counting circuit, one of said input lines connected to all of said first gate circuit means for carrying pulses therethrough to said succeeding stage input only if said first gate circuit means is open, and connected to the input of the first flip-flop stage, the other input line connected to all of said second gate circuit means for carrying pulses therethrough to said succeeding stage input only if said second gate circuit means is open, and also connected to the input of said first flip-flop stage, and isolating means in the connection between each of said input lines and the input of said first stage to prevent pulses on one input line from appearing on the other, whereby input pulses applied to one of said input lines will be added to the count in said counting circuit and whereby input pulses applied to the other input line, not simultaneously with the add pulses, will be subtracted from the count.

2. A two-way binary counter comprising a plurality of flip-flop stages, an upper and lower gate circuit associated with each of said stages, each of said upper gate circuits connected to be energized by the potential of one number condition of its associated stage, each of said lower gate circuits connected to be energized by the potentials of the other number condition of its associated stage, an isolator circuit connected at the trigger point of each flip-flop stage, an upper input line connected to the upper gate circuit and the isolator circuit associated with the first stage, a lower input line connected to the lower gate circuit and the isolator circuit associated with the first stage at a point isolated from the connection of said upper input line thereto, an output line from each of said upper gate circuits connecting to both the upper gate circuit and the isolator circuit associated with each of the succeeding stages, an output line from each of said lower gate circuits connecting to both the lower gate circuit and the isolator circuit associated with each of the succeeding stages at points isolated from the connections of the respective upper gate output lines thereto, whereby an input pulse to said counter on said upper input line triggers said first stage and passes serially through all open upper input gate circuits to the first upper gate circuit that is closed and triggers all said associated stages including the stage whose upper gate circuit stopped said input pulse, and whereby an input pulse to said counter on said lower input line triggers said first stage and passes serially through all open lower input gates to the first lower gate circuit that is closed and triggers all said associated stages including the stage whose lower gate circuit stopped said latter input pulse.

3. Apparatus in accordance with claim 2 wherein said upper and lower gate circuits are identical and each includes two crystal diodes, one of said diodes having the cathode end thereof connected to the associated input line to said stage, the other of said diodes having the cathode end thereof reflecting the potential of the number condition of said stage, both said diodes having the plate ends thereof joined and connected to a positive source through a common resistor, the output line from said gate circuits connected at the junction of the plates of said diodes, whereby when the reflected number condition of said stage corresponds to a positive potential, a positive pulse on said associated input line creates a positive pulse on said output line by a disappearance of a voltage drop across said resistor.

4. Apparatus in accordance with claim 2 wherein said isolator circuits are similar and each includes two crystal diodes, one of said diodes having the plate end thereof connected to the upper input line to a stage, the other of said diodes having the plate end thereof connected to a lower input line to a stage, both said diodes having the cathode ends thereof joined and connected to a negative source through a common resistor, the output line from said isolator circuit connected at the junction of the cathodes of said diodes, whereby a positive pulse on one of said input lines creates a positive pulse on said output line resulting from current flow through said resistor.

5. A two-way binary counting circuit comprising a plurality of flip-flop stages, an upper and lower gate circuit associated with each of said stages, each of said upper gate circuits connected to sense the potential change of one number condition of a stage, each of said lower gate circuits connected to sense the potential change of the other number condition of a stage, an isolator circuit connected at the trigger point of each flip-flop stage except the first, an input line carrying pulses to be counted connected to the trigger point of said first flip-flop stage, an output line from each of said upper gate circuits connecting to the isolator circuit of the succeeding stage, an output line from each of said lower gate circuits connecting to the isolator circuit of the succeeding stage at a different point electrically isolated from the connection from each of said upper gate circuits, a sign control flip-flop, an upper control line communicating the potential from one of the plate circuits of said control flip-flop to each of said upper gate circuits, a lower control line communicating the potential on the other plate circuit of said control flip-flop to each of said lower gate circuits, whereby pulses fed in on said input line cause the counting circuit to count up or down dependent on the state of said sign control flip-flop.

6. A two-way binary counting circuit comprising a plurality of flip-flop stages, an upper and lower gate circuit associated with each of said stages, each of said upper gate circuits connected to sense the potential change of one number condition of a stage, each of said lower gate circuits connected to sense the potential change of the other number condition of a stage, a first input line carrying pulses to be counted connected to the trigger point of said first flip-flop stage, an output line from each of said upper gate circuits connecting to the trigger point of the succeeding flip-flop stage, an output line from each of said lower gate circuits connecting to the trigger point of the succeeding flip-flop stage, a sign control flip-flop, a second input line feeding sign pulses into said sign control flip-flop, an upper control line communicating the potential from one of the plate circuits of said control flip-flop to each of said upper gate circuits, a lower control line communicating the potential on the other plate circuit of said control flip-flop to each of said lower gate circuits, whereby pulses fed in on said first input line cause the counting circuit to count up or down dependent on the state of said sign control flip-flop.

7. Apparatus in accordance with claim 6 wherein said upper and lower gate circuits are similar, each of said gate circuits comprises a pair of crystal diodes with their cathode-ends interconnected, a differentiating circuit for connecting said interconnection to one of the plate circuits of said flip-flop stage, the plate-end of one of said crystal diodes connected to reflect the potential of one plate circuit of said control flip-flop, the plate-end of said other crystal diode connected to the trigger point of said next flip-flop stage, whereby a negative going differentiated output of said flip-flop stage passes through said gating circuit when the connected potential of said control flip-flop is negative.

8. Apparatus in accordance with claim 5 wherein said upper and lower gate circuits are identical and each includes two gate crystal diodes, the cathode end of one gate diode connected to one of said control lines from said control flip-flop, the cathode end of the other gate diode reflecting the potential of the number condition of its associated stage, the plate ends of both gate diodes joined together and connecting to a positive source through a common resistance, the output line from each of said gate circuits connected at the plate ends of said gate diodes, wherein said isolator circuits are identical and each includes two isolator crystal diodes, the plate end of one isolator diode connected to the upper gate output line from the previous stage, the plate end of the other isolator diode connected to the lower gate output line from said previous stage, the cathode ends of both isolator diodes joined together and connecting to a negative source through a second resistance, the output line from each of said isolator circuits connected at the cathode ends of said isolator diodes, and a differentiating circuit also at the trigger point of each flip-flop stage except the first, to provide a given polarity pulse input to each following stage from each cycle of change in potential across said resistances.

9. A two-way binary counting circuit comprising a plurality of flip-flop stages, an upper and lower gate circuit associated with each of said stages, each of said upper gate circuits connected to sense one condition of an associated stage, each of said lower gate circuits connected to sense another condition of an associated stage, an isolator circuit connected at the trigger point of each flip-flop stage except the first, an input line carrying pulses to be counted connected to the trigger point of said first flip-flop stage, an output line from each of said upper gate circuits connected to the isolator circuit of the succeeding stage, an output line from each of said lower gate circuits connected to the isolator circuit of the succeeding stage at a different point electrically isolated from the connection from each of said upper gate circuits, means for qualifying said upper gates and disqualifying said lower gates during additive counting, and means for qualifying said lower gates and disqualifying said upper gates during subtractive counting.

References Cited in the file of this patent

UNITED STATES PATENTS

| | | |
|---|---|---|
| 2,462,275 | Morton et al. | Feb. 22, 1949 |
| 2,537,427 | Seid et al. | Jan. 9, 1951 |
| 2,539,623 | Heising | Jan. 30, 1951 |

OTHER REFERENCES

"The Binary Quantizer," Barney, Electrical Engineering, November, 1949, pp. 962–967.